April 1, 1969
L. R. BAKER ETAL
3,436,154
APPARATUS FOR, AND METHODS OF, TESTING LENSES
Filed May 28, 1965
Sheet 1 of 4
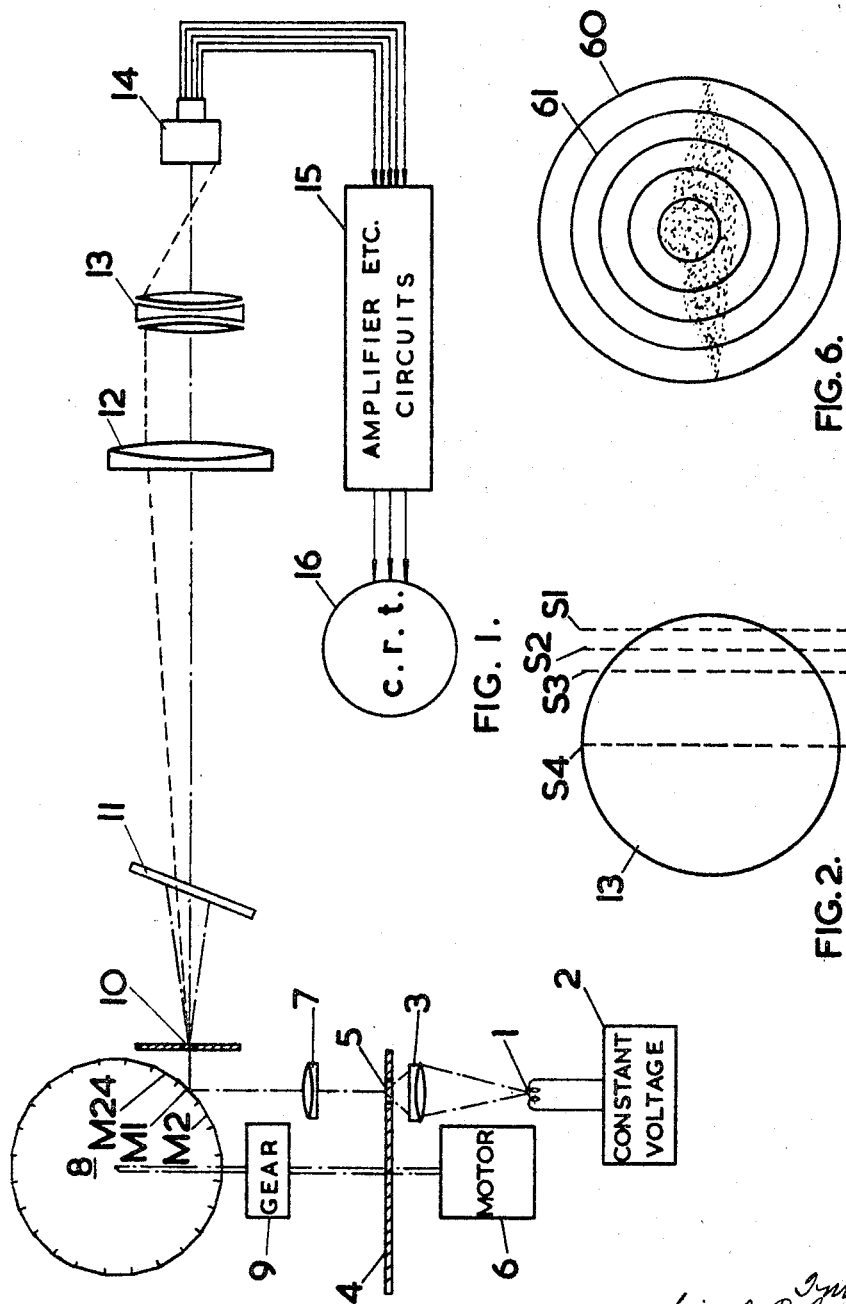

Inventors
Lionel R. Baker
Hastings C. M. Bertoya
John R. Mann
James N. Whyte

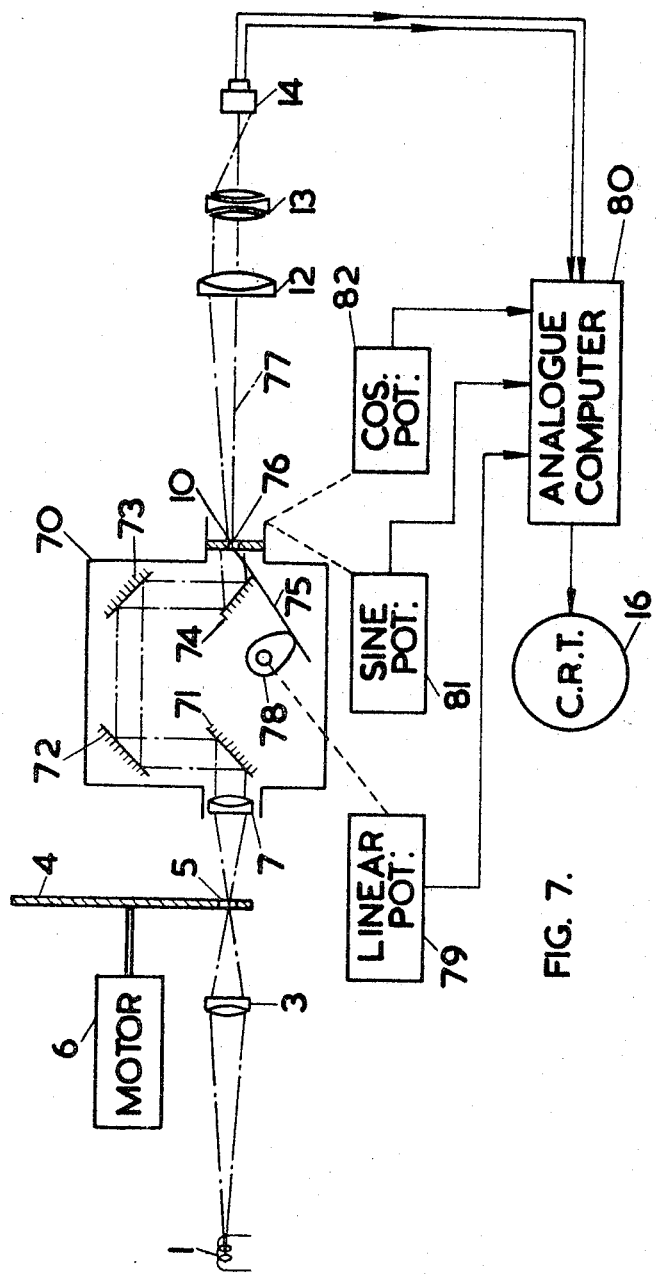

United States Patent Office
3,436,154
Patented Apr. 1, 1969

3,436,154
APPARATUS FOR, AND METHODS OF,
TESTING LENSES
Lionel Richard Baker, Orpington, Hastings Charles Maxim Bertoya, South Norwood, London, John Raymond Mann, Orpington, and James Norwood Whyte, Otford, near Sevenoaks, England, assignors to National Research Development Corporation, London, England
Filed May 28, 1965, Ser. No. 459,629
Claims priority, application Great Britain, May 29, 1964, 22,343/64
Int. Cl. G01b 9/00
U.S. Cl. 356—124
11 Claims

ABSTRACT OF THE DISCLOSURE

Apparatus for testing lenses to detect defects or aberrations in different parts of the lens by scanning the lens with a pencil beam of light and electro-optically displaying the deviations of the pencil beam which has passed through the lens and impinged upon a position-sensitive photo responsive element. The scanning may be accomplished by reflecting a beam of light from an appropriate source with a rotating polygon shaped carrier having a number of mirrors each displaced a given angular distance from its neighbor in two directions so that the entire lens is scanned in successive lines during a complete revolution. Alternatively, two oscillating mirrors may be used. The pencil beam can be chopped to provide a series of light pulses incident on the lens and the electrical signals utilized to control the displacement on a cathode ray tube so that the number and extent of the defects can be readily seen by visually inspecting the deviations of the displaced spots from the center of the cathode ray screen.

---

The present invention relates to apparatus for, and methods of, testing lenses.

One known method of testing lenses is to project parallel light through a foraminated plate on to the lens to be tested and examining the spot diagram produced by the resulting spots of light formed in the focal plane of the lens. With this method it is difficult to interpret the resulting spot diagram because, inter alia, the spots are not clearly defined and are usually close together.

It is an object of the present invention to provide improved apparatus for testing a lens.

According to the present invention there is provided apparatus for testing lenses including a small aperture, means for scanning a pencil of light passing through the aperture to build up a scanning raster on a lens to be tested and position-sensitive photo-responsive means arranged so that it can be located at the conjugate focus of the lens to be tested, the photo-responsive means having, for two mutually perpendicular directions at right angles to the principal axis of the lens to be tested, a substantially linear characteristic of output versus displacement, from a datum point, of light falling on it. The light producing the scanning raster may conveniently be chopped in order to provide an alternating current output from the photo-responsive means.

Figure 3:
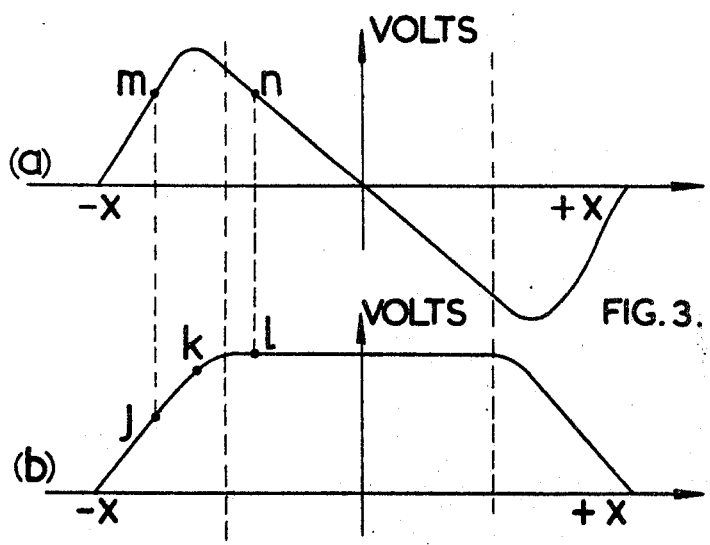
Figure 5:
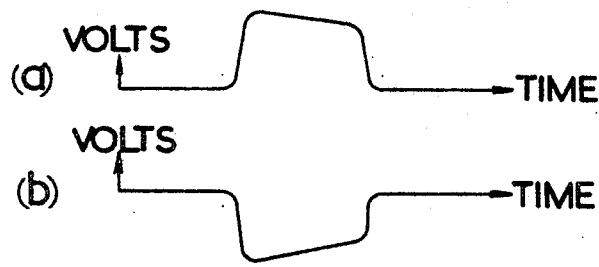
Figure 4:
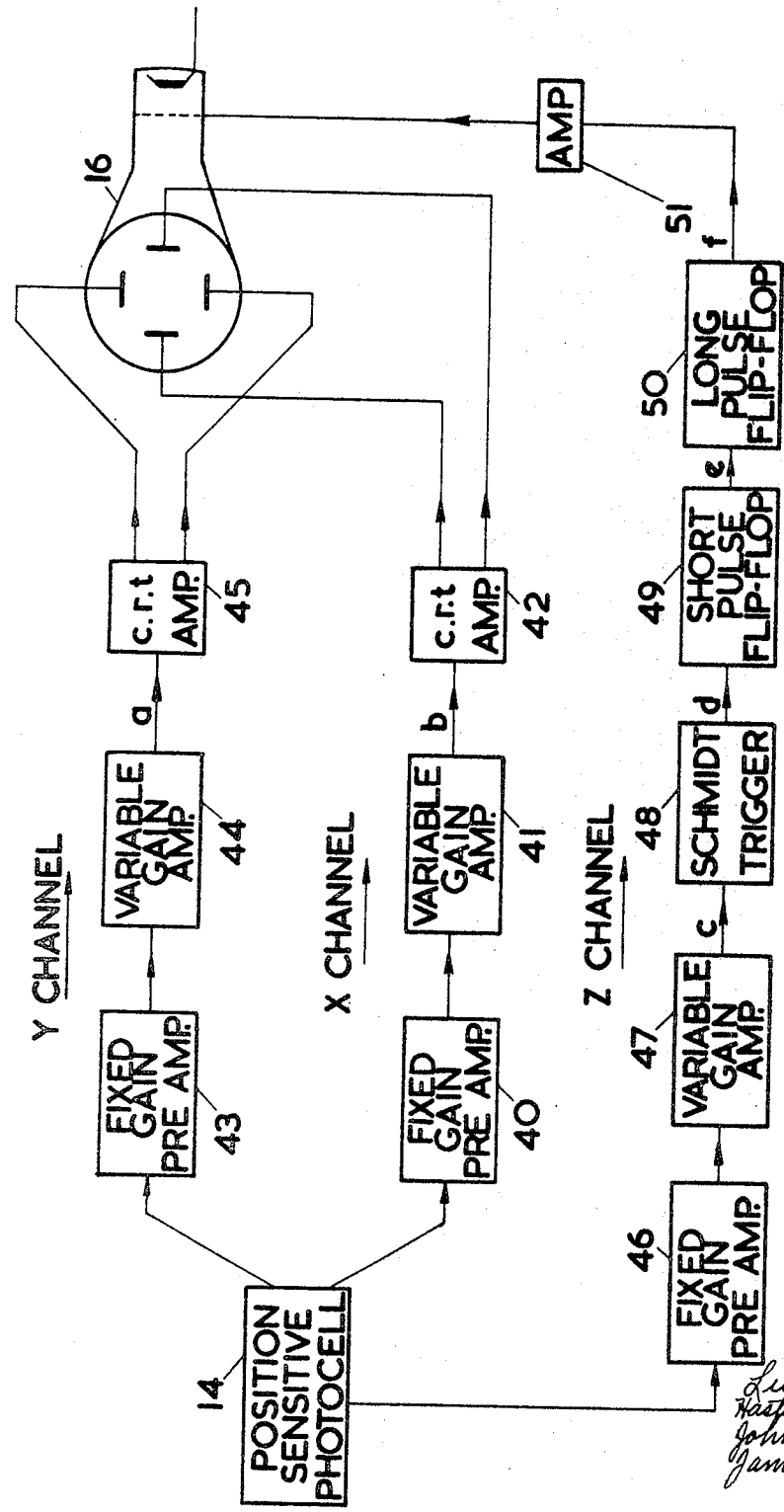

In order that the invention may be more clearly understood, embodiments of the present invention will now be described, by way of example, with reference to the accompanying drawings, in which:

FIGURE 1 is a diagrammatic representation of one form of lens testing apparatus, FIGURE 2 is a drawing illustrating the action of a part of the apparatus shown in FIGURE 1, FIGURE 3 is a graphical representation of characteristic responses of part of the apparatus shown in FIGURE 1, FIGURE 4 is a block circuit diagram showing in greater detail part of the apparatus shown in FIGURE 1, FIGURE 5 illustrates graphically waveforms occurring at various points in the circuit shown in FIGURE 5, FIGURE 6 is an illustration of a possible output from the apparatus shown in FIGURE 1, and FIGURE 7 is a diagrammatic representation of another form of lens testing apparatus.

FIGURE 1 shows a filamentary light source 1 fed with current from a constant voltage source 2. Light from the light source 1 is projected on to a condenser lens 3. The condenser lens 3 focuses an image of the light source 1 at the plane of a light chopper 4. The light chopper 4 has fifteen clear slits (one of which is shown at 5) equally spaced in a circle concentric with its axis. The spacing between the slits is ten times the width of the slits measured along this circle. Conveniently the slits may be two millimeters wide. The chopper 4 is driven by a fifty cycles/second synchronous motor 6. By this means, the light from the light source 1 is chopped into pulses having a pulse repetition frequency of 750 pulses/second.

Light passing through the chopper 4 also passes through a filament relay lens 7 on to a mirror polygon 8 having twenty-four rectangular front-aluminised mirrors equally spaced round its circumference. Three of these mirrors bear references M1, M2 and M24. Each of these mirrors subtends an angle of fifteen degrees at the centre of the polygon. Each of the mirrors has a tilt about an axis contained in the plane of the mirror and the plane of the polygon. The tilt of each mirror in the series M1 to M24 differs by 6¼ minutes of arc from the tilt of the immediately preceding mirror, the total difference in tilt between the mirrors M1 and M24 being 2½ degrees. The purpose of this tilting will be explained hereinafter with reference to FIGURE 2. The mirror polygon 8 is driven in synchronism with the chopper 4 through a gear box 9 having a reduction ratio of 200:1.

As the mirror polygon 8 rotates, light is scanned through a small fixed aperture in the form of a pinhole 10 in a diaphragm and thence through a calibration plate 11, a collimator lens 12 and a lens 13 under test on to a position-sensitive photo-cell 14 situated at the conjugate focus of the lens 13. One suitable type of position-sensitive photo-cell which is responsive to infra-red light is the Wallmark diode. This diode is described in the proceedings of the I.R.E. (New York), vol. 45 at page 474 and also in Optica Acta, vol. 7, page 191. Outputs from the position-sensitive photo-cell 14 are applied through amplifiers and other electronic circuits 15 to a cathode-ray tube 16. The action of the position-sensitive photo-cell 14 and of the amplifiers and other electronic circuits 15 will be described hereinafter with reference to FIGURES 3, 4 and 5.

The operation of the apparatus thus far described with reference to FIGURE 1 will now be described, reference being made to FIGURE 2. The filament relay lens 7 is so chosen in relation to the position of the collimator lens 12 that when the light beam is reflected off one of the mirrors M1 to M24 through the pinhole 10, an image of the light source 1 is formed in the pupil plane of the collimator lens 12. The collimator lens 12 has the pinhole 10 at its focus. The position-sensitive photo-cell 14 is placed at the focus of the lens 13 under test so that a reduced image of the pinhole 10 is formed on the position-sensitive photo-cell. As the mirror polygon 8 rotates, light from the source 1 is scanned over the pinhole 10. During a 2½ degrees rotation of each mirror (that is to say a 5 degrees sweep of the reflected ray) light passes through the pinhole 10 so that the lens 13 is scanned in a vertical line by the light passing through the pinhole 10. However, this scan will not consist of continuous illumination because of the chopper 4. Thus, for each sweep due to a single mirror the light will be split up into approximately twenty pulses. A representation of such a sweep in relation to the lens 13 is given at S1 in FIGURE 2, the dashes representing areas of light illumination in the plane of the lens along a line passing through the lens. Because each successive mirror M1, M2 etc., is tilted by 6¼ minutes of arc with respect to the next, a raster of twenty-four such sweeps is built up for each rotation of the mirror polygon 8. The total horizontal scan caused by the successive mirrors is again 5 degrees in the horizontal direction. A number of vertical sweeps across the lens 13 are illustrated at S1 to S4. There are, of course, twenty-four such sweeps in a complete raster, one sweep corresponding to each mirror. Therefore, each raster is made up of approximately 500 separate illuminations of the lens 13 and its surrounding area.

If the lens 13 is perfect, then each illumination by parallel light from the collimator lens 12, wherever the light impinges on the lens 13, will cause the image of the pinhole 10 to fall on the axis of the lens 13 at its focus where the centre of the position-sensitive photo-cell 14 is located. If, however, the lens has imperfections the image will fall on the photo-cell 14 elsewhere than at its centre.

FIGURE 3 shows two output characteristics of the position sensitive photo-cell 14. FIGURE 3(a) shows a voltage output of the photo-cell 14 as an illuminating spot of light moves from one side to the other of the cell in the horizontal $x$ direction, the output being zero when the centre of the cell is illuminated. A similar voltage response is obtained from a second output of the photo-cell 14 for a spot of light traversing the cell in the vertical $y$ direction. FIGURE 3(b) shows the change in voltage at a third voltage output of the photo-cell 14 as an illuminating spot of light travels in the $x$ direction. This voltage output is not, however, simply related to the position of the spot in the $x$ direction because it is similarly related to the position of the illuminating spot in the $y$ direction. A suitable position-sensitive photo-cell giving the type of characteristics illustrated in FIGURE 3 is, as hereinbefore stated, the Wallmark diode.

FIGURE 4 is a block circuit diagram showing how the outputs from the photo-cell 14 are applied to the cathode-ray tube 16 to provide a measure of the imperfections in the lens 13.

The voltage from the position-sensitive photo-cell 14 indicating the position in the $x$ direction of a spot of light on the photo-cell corresponding to a pulse of light travelling through the lens 13 is applied to an $x$ channel comprising a fixed-gain pre-amplifier 40, a variable-gain amplifier 41 and a cathode-ray tube deflection amplifier 42. The output of the deflection amplifier 42 is applied to the horizontal deflection (or $x$) plates of the cathode-ray tube 16. By this means the deflection of the cathode-ray tube beam in the $x$ direction is made to represent the relative positions in the $x$ direction of successive spots of light on the position-sensitive photo-cell 14 as each pulse of light is transmitted through the lens 13. Similarly, the voltage from the position-sensitive photo-cell 14 indicating the position in the $y$ direction of a spot of light on the photo-cell corresponding to a pulse of light travelling through the lens 13 is applied to a $y$ channel comprising a fixed-gain pre-amplifier 43, a variable-gain amplifier 44 and a cathode-ray tube deflection amplifier 45. The output of the deflection amplifier 45 is applied to the vertical (or $y$) plates of the cathode-ray tube 16. By this means the deflection of the cathode-ray tube beam in the $y$ direction is made to represent the relative positions in the $y$ direction of successive spots of light on the position-sensitive photo-cell 14 as each pulse of light is transmitted through the lens 13.

A third voltage from the position-sensitive photo-cell 14, corresponding the characteristic illustrated in FIGURE 3(b) is applied to a $z$ channel. This channel consists of a fixed-gain pre-amplifier 46, a variable-gain amplifier 47, a Schmitt trigger threshold circuit 48, a short pulse monostable flip flop circuit 49, a long pulse monostable flip flop circuit 50 and an amplifier 51. The output of the amplifier 51 is applied to the control grid of the cathode-ray tube 16 to control the brightness of the spot formed on the tube screen.

The necessity for the $z$ channel will be seen from FIGURE 5 which shows some typical waveforms resultant from the receipt of one pulse of light by the photo-cell 14, when the spot of light formed thereby is displaced on the photo-cell in both the $x$ and $y$ directions. The waveforms $(a)$ and $(b)$ of FIGURE 5 show typical waveforms at points $a$ and $b$ at the outputs of the variable gain amplifiers 44 and 41 in the $y$ and $x$ channels (FIGURE 4) respectively. If the cathode ray tube trace were continuously bright these waveforms would cause the cathode ray tube trace to perform a closed loop instead of delineating a single spot respresentative of the displacement of the light spot from the centre of the photo-cell 14. In order to avoid this, it is necessary to brighten the cathode-ray tube trace only when the voltages represented by waveforms $(a)$ and $(b)$ are at their maximum. This is achieved by the $z$ channel in the following manner. The voltage waveform at FIGURE 5(c) shows the waveform (corresponding to those shown at $(a)$ and $(b)$) at the point $c$ at the output of the variable-gain amplifier 47. The waveform $(c)$ is applied to the Schmitt trigger 48 which when the voltage waveform $(c)$ exceeds a predetermined voltage produces a square voltage waveform, shown at FIGURE 5(d), at its output $d$. The short pulse monostable flip flop 49 then generates a short pulse at its output $e$ as shown in FIGURE 5(e). This pulse begins at the leading edge of the Schmitt trigger pulse and has a duration of about one third of that of the Schmitt trigger pulse. The long pulse monostable flip flop 50 then generates a pulse at its output $f$ as shown in FIGURE 5(f). This pulse begins at the trailing edge of the pulse at $e$ and ends about two-thirds of the way through the Schmitt trigger pulse. The pulse at the output $f$ is applied to the grid of the cathode-ray tube 16 via the amplifier 51. By this means the cathode-ray tube trace is brightened only during approximately the centre third of the deflection waveforms $(a)$ and $(b)$. That is to say, the trace records only the maximum voltages of these waveforms and therefore depicts a spot corresponding in position to the position of the light spot on the photo-cell 14.

The $z$ channel also serves another purpose. The Schmitt trigger 48 is set to trigger only when its input voltage reaches a predetermined threshold level. Thus, if the light spot impinges on the position-sensitive photo-cell 14 such that, for example, the corresponding point on the characteristic curve of FIGURE 3(a) is the point $m$, then the output representing the position of the light spot in the $x$ direction will be indistinguishable from an output corresponding to the point $n$. Therefore the position of the resulting spot on the cathode-ray tube would be misleading. However, if the Schmitt trigger 48 is set to trigger only at input voltages greater than $k$ shown in FIGURE 3(b), it will not trigger at a voltage $j$ corresponding to the point $m$ but will trigger at a voltage $l$ corresponding to the point $n$. Hence the cathode-ray tube trace will not be brightened to form a spot when the light spot position on the cell 14 corresponds to the point $m$ but will be brightened when the light spot position corresponds to the point $n$.

FIGURE 6 illustrates the spot diagram obtained on the face of the cathode-ray tube 16 when the lens 13 under test suffers from astigmatism. In this example, the spots are spread out along the horizontal or $x$ axis indicating the astigmatic nature of the lens. In contrast, in a spot diagram for a near-perfect spherical lens, the spots would be concentrated at the centre of the cathode-ray tube face. Also shown in FIGURE 6 are concentric rings two of which bear references 60 and 61. These rings are generated, alternately with the spots on the diagram, on the face of the cathode-ray tube 16 for calibration purposes. They may be generated by means of an oscillator (not shown) which produces two sinusoidal voltages in quadrature. One of the sinusoidal voltages is then used to deflect the cathode-ray tube beam in the $x$ direction whilst the other deflects the beam in the $y$ direction. The different diameters of the rings may be obtained by means of attenuators (not shown) the attenuations of which are varied in discrete steps. During the generation of the rings the voltage on the grid of the cathode-ray tube is raised so that the rings are traced out brightly. The cathode-ray tube screen is arranged to be persistent so that although the rings 60, 61 et cetera can be generated alternately with the spots on the spot diagram, both may be viewed or photographed at the same time.

Calibration of the apparatus is carried out by the following method. With a lens, such as the lens 13, in position, and the mirror polygon 8 disconnected from the chopper 4, the mirror polygon 8 is moved so that light passes approximately through the centre of the lens 13 on to the photo-cell 14. The calibration plate 11 is then inclined at an angle to the axis of the system to offset the spot on the photo-cell 14 from the centre thereof by a known amount. The calibration plate 11 is then rotated in the manner of a swash plate about the axis of the system so that the light spot described a circle of known diameter on the surface of the photo-cell 14. This causes a dotted circle to be traced out on the cathode-ray tube screen. The largest diameter calibration ring 60 (FIGURE 6) is also traced out on the cathode-ray tube screen and the gains of the variable gain amplifiers 41 and 44 (FIGURE 4) are adjusted until the two circles coincide. In this way, a known displacement of the spot on the photo-cell 14 is related to the calibration rings shown in FIGURE 6.

It will be realised by those skilled in the art that the embodiment of the invention described with reference to FIGURES 1 to 6 is given by way of example only and many other ways of carrying out the invention may be envisaged. Thus, for example, the collimator lens 12 (FIGURE 1) is not essential to the working of the apparatus but is desirable in testing lenses one conjugate focus of which is intended to be at infinity. In the case of other types of lens to be tested, the collimator lens 12 may be omitted, the pinhole 10 being placed at one chosen conjugate focus and the photo-cell 14 being placed at the other conjugate focus of the lens to be tested. The cathode-ray tube 16 may be replaced by servo systems acting upon two parallel plate micrometers (similar to the calibration plate 11 and placed in the system in approximately the same position as the calibration plate 11) rotatable about a vertical and a horizontal axis respectively. The outputs of the variable gain amplifiers 41 and 44 would then control the parallel plate micrometers to bring the spot back to the centre of the photo-cell 14. Transducers may then be coupled to the micrometers to enable their displacements to be recorded. These displacements would then be an indication of the quality of the lens. For this purpose, the incident light would be chopped at a lower frequency of 400 cycles/second and the mirror polygon would revolve more slowly, say at one revolution every minute. This would allow sufficient time for the servo systems to follow accurately.

In a further modification, the mirror polygon 8 may be replaced by two mirror systems arranged to scan the light impinging on the lens 13 across successive diameters of the lens at varying angles so as to build up a scanning raster covering the whole lens. Transducers are then connected to the mirror systems to indicate the position $r$ along a diameter and a diameter angle $\phi$, in relation to a datum diameter, specifying the position on the lens 13 through which light is passing. At the same time the position on the photo-cell 14 at which light impinges thereon is given by the outputs from the amplifiers 41 and 44 in terms of co-ordinates $x$ and $y$. The outputs of the transducers and of the amplifiers 41 and 44 may then be passed to an analogue computer which computes the wavefront of the lens 13. This information may be used to control a machine tool for grinding away portions of the lens surface to obtain a desired result.

A suitable system for computing and displaying the wavefront of a lens is shown in FIGURE 7. Those parts of the system which are the same as those shown in FIGURE 1 bear the same reference numerals and will not now be described in detail.

FIGURE 7 shows a filamentary light source 1, a condenser lens 3 and a light chopper 4 having slits therein, one of which is shown at 5. FIGURE 7 also shows a small fixed aperture in the form of a pinhole 10, a collimator lens 12, a lens 13 under test, a position-sensitive photo-cell 14 and a cathode-ray tube display 16. The mirror polygon 8 of FIGURE 1 is replaced by a double periscope mirror scanning system 70 consisting of three fixed mirrors 71, 72 and 73 and a pivotally mounted mirror 74. The mirror 74 is mounted on a cam-follower arm 75 which pivots about a point 76 which lies on the principal axis 77 of the system as a whole. The cam follower arm bears on a cam 78 which is mechanically coupled to a motor and to the wiper of a linear potentiometer 79. The output of the linear potentiometer 79 is applied to an analogue computer 80. The double periscope mirror scanning system rotates in its entirety about the principal axis 77 of the system and is mechanically coupled to a motor and to the wipers of a sine potentiometer 81 and a cosine potentiometer 82. The outputs of the sine and cosine potentiometers 81 and 82 are applied to the analogue computer 80. The outputs of the position-sensitive photo-cell 14 are also applied to the analogue computer 80. The output of the analogue computer 80 is applied to the cathode-ray tube display 16 to display the wavefront of the lens 13.

The operation of the embodiment shown in FIGURE 7 is as follows. The double periscope mirror system rotates about the principal axis 77 in steps and for each rotational step the cam 78 moves the mirror 74 so that the lens 13 is scanned across a diameter by light passing through the pinhole 10. The output of the linear potentiometer 79 provides a voltage proportional to an angle $\theta$ which is representative of the radial position $r$ of the light passing through the lens. The outputs of the sine and cosine potentiometers 81 and 82 provide voltages proportional to the sine and cosine respectively of the angle $\phi$ which are representative of the diameter, relative to a datum diameter, across which the lens 13 is being scanned. The outputs from the position-sensitive photo-cell 14 represent the displacements $x$ and $y$ in cartesian coordinates of the image of the pinhole 10 falling on the photo-cell. The angle $\theta$ is always small so that the wavefront, W, of the lens 13 can be computed in the analogue computer 80 according to the equation:

$$W = \frac{N}{R}\int_0^\theta (y \sin \phi + x \cos \phi) d\theta$$

where

N is the refractive index of the image space and is normally equal to unity, and R is the radius of the reference sphere.

The value of W is applied by the analogue computer 80 to the $y$-deflection plates of the cathode-ray tube display 16 whilst a voltage derived from the output of the linear potentiometer 79 is applied by the analogue computer 80 to the $x$-deflection plates of the cathode-ray tube display 16 so that the wavefront of the lens 13 is traced out on the screen.

Although the position-sensitive photo-cell 14 has been hereinbefore described as a Wallmark diode type of photo-cell, this type of photo-cell is useful only at infrared wavelengths of light. However, this type of position-sensitive photo-cell may be replaced by any other photo-cell giving similar linear displacement characteristics and sensitive to other portions of the optical spectrum.

We claim:
1. Apparatus for testing lenses, comprising,
a light source,
a diaphragm having an aperture,
scanning means for directing a beam of light from said light source through said aperture at cyclically varied scanning angles with respect to said diaphragm to form a scanning pencil beam of light on the side of the said aperture remote from the said light source,
means for mounting a lens to be tested in the path of said scanning pencil beam of light so that the lens is progressively scanned by said pencil beam,
photo-responsive means having an area position sensitive to illumination from a pencil beam for producing electrical signals quantitatively indicating displacement of said pencil beam from a given point within said sensitive area,
means mounting said photo-responsive means at a position so that the lens to be tested focuses an image of said aperture on said sensitive area of said photo-responsive means, so that said electrical signals produced by the said photo-responsive means at any instant will represent a displacement from said given point of said pencil beam due to defects or aberrations in a part of said lens in the path of said beam, and
display means for providing a visual representation of said displacements of said pencil beam from said given point and having inputs connected to said photo-responsive means to receive said electrical signals and electronic means to utilize said electrical signals to give a visual representation on said display means of said displacements of said pencil beam on said sensitive area of said photo-responsive means from said given point.

2. Apparatus as claimed in cliam 1 wherein said scanning means includes pulsing means for rendering the illumination of said aperature intermittent, so that a multitude of distinct areas of said lens under test are separately and successively tested.

3. Apparatus as claimed in claim 2 including a cathode-ray tube display means for providing a visual representation of said displacements of said pencil beam, said display means having a brightening input connected to said photo-responsive means for brightening said representation on said display means whenever said sensitive area of said photo-responsive means receives more than a pre-determined amount of illumination, and having deflection inputs connected to said photo-responsive means to receive said electrical signals in order to give said representation on said display means a displacement indicative of said displacement of said pencil beam from said given point on said sensitive area of said photo-responsive means.

4. Apparatus as claimed in claim 3 including a threshold circuit connected to said photo-responsive means, and pulse-forming means connected to said threshold circuit, said threshold circuit and pulse forming means together providing the connection from said photo-responsive means to said brightening input of the display means so that said representation on the display means is brightened only during periods shorter than and occurring within the periods of illumination of said sensitive area of said photo-responsive means.

5. Apparatus as claimed in claim 1 wherein said scanning means includes a polygon-shaped carrier rotatably mounted about its axis, and having mirrors attached around its circumference, said mirrors being inclined at different angles to the axis of the carrier and disposed to reflect light from said light source on to said aperature with angles of incidence which change as said carrier rotates, and means for rotating the carrier.

6. Apparatus as claimed in claim 5 wherein said scanning means also includes a chopper wheel mechanically coupled to said means for rotating the carrier, having apertures and opaque portions disposed to pass successively through the path of the light from said light source, thereby rendering the illumination of said lens under test intermittent when said carrier and said chopper wheel are rotated.

7. Apparatus as claimed in claim 6 including cathode-ray tube display means for providing visual representations of the displacements of the pencil beam, said display means having a brightening input connected to said photo-responsive means for brightening said representation on said display means whenever said sensitive area of said photo-responsive means receives more than a pre-determined amount of illumination, and having deflection inputs connected to said photo-responsive means to receive said electrical signals thereof, so as to give the representation on the display means a displacement indicative of the displacement of said pencil beam on said sensitive area of said photo-responsive means from said given point.

8. Apparatus as claimed in claim 7 including a threshold circuit connected to said photo-responsive means, and pulse-forming means connected to said threshold circuit, said threshold circuit and pulse forming means together providing the connection from the photo-responsive means to the brightening input of the display means so that the representation on said display means will be brightened only during periods shorter than and occurring within the periods of illumination of said sensitive area of said photo-responsive means.

9. Apparatus as claimed in claim 1 wherein said scanning means comprises:
a reflector assembly including two optical aperatures and a plurality of reflectors mounted in said reflector assembly so that at least one reflector is mounted so that its inclination with respect to the assembly can be varied, and said plurality of reflectors are disposed to receive said beam of light from said light source through one of said optical aperatures and to transmit said beam of light through the other of the said optical aperatures and through said aperature in said diaphragm on to said lens to be tested,
turning means for progressively rotating said reflector assembly about a first axis which passes through both of said optical aperatures, and
tilting means for cyclically tilting said one reflector about a second axis, said second axis being fixed with respect to said reflector assembly, so as to vary the inclination of said one reflector with respect to said first axis so that said tilting means will provide a scanning motion of said pencil beam in a radial direction across said lens to be tested, and the turning means will progressively rotate said radial direction about the axis of said lens to be tested.

10. Apparatus as claimed in claim 9 and comprising first transducer means mechanically coupled to said tilting means for producing an electrical signal representing the inclination of said one reflector with respect to said first axis, and second transducer means mechanically coupled to said turning means for producing at least one electrical signal representing the rotation of said reflector assembly from a datum position, and means connecting both of said electrical signals to said display means.

11. Apparatus as claimed in claim 10 and wherein said display means comprises analog computer means connected to said photo-responsive means and to said first transducer means and to said second transducer means, and responsive to the said electrical signals thereof for producing electrical output signals which will represent the wavefront of said lens to be tested, and wavefront display means connected to said analog computer means and responsive to said electrical output signals for producing a visual representation of said wavefront.

References Cited

UNITED STATES PATENTS

| | | | |
|---|---|---|---|
| 2,352,179 | 6/1944 | Bolsey | 88—56 |
| 2,771,004 | 11/1956 | Sachtleben | 88—56 |
| 2,773,413 | 12/1956 | Schade | 88—56 |

OTHER REFERENCES

Herriott, W., A photoelectric Lens Bench, J.O.S.A., vol. 37, No. 6, June, 1947 pp. 472–474.

RONALD L. WIBERT, *Primary Examiner.*

T. MAJOR, *Assistant Examiner.*